United States Patent
Laherty et al.

(10) Patent No.: US 9,713,214 B2
(45) Date of Patent: *Jul. 18, 2017

(54) TIME SYNCHRONIZATION OF LIGHTING SERVICES

(71) Applicant: Cisco Technology, Inc., San Jose, CA (US)

(72) Inventors: Matthew A. Laherty, Bloomington, IN (US); Donald Schriner, Fishers, IN (US); Charles Calvin Byers, Wheaton, IL (US)

(73) Assignee: Cisco Technology, Inc., San Jose, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/563,403

(22) Filed: Dec. 8, 2014

(65) Prior Publication Data

US 2016/0165703 A1    Jun. 9, 2016

(51) Int. Cl.
*G08B 7/06* (2006.01)
*H05B 33/08* (2006.01)
*H05B 37/02* (2006.01)

(52) U.S. Cl.
CPC ....... *H05B 33/0842* (2013.01); *H05B 37/029* (2013.01); *H05B 37/0245* (2013.01); *Y02B 20/346* (2013.01); *Y02B 20/42* (2013.01)

(58) Field of Classification Search
CPC .................................................. G05B 19/04
USPC .............. 340/815.4, 815.65, 815.66, 286.01, 340/309.16, 815, 45
See application file for complete search history.

(56) References Cited

U.S. PATENT DOCUMENTS

| | | |
|---|---|---|
| 8,352,769 B1 | 1/2013 | Ghose et al. |
| 8,732,501 B1 | 5/2014 | Ghose et al. |
| 8,745,429 B2 | 6/2014 | Ghose et al. |
| 9,307,621 B1 * | 4/2016 | Parello ............... H05B 37/0272 |

(Continued)

OTHER PUBLICATIONS

Hong Kong Tourism Board, "A Symphony of Lights", http://www.discoverhongkong.com/eng/see-do/highlight-attractions/harbour-view/a-symphony-of-lights.jsp, Retrieved Dec. 8, 2014, 3 pages.

(Continued)

*Primary Examiner* — Tuyet Vo
(74) *Attorney, Agent, or Firm* — Edell, Shapiro & Finnan, LLC

(57) ABSTRACT

Techniques presented herein are directed to synchronizing the execution time of lighting operations within a networked lighting system. In one example, a network device that is connected to at least one networked light fixture accepts one or more timing reference messages representing a network time base. The network device generates one or more lighting control messages that identify at least one light control setting for the networked light fixture connected to the network device. Based on the one or more timing reference messages, the network device encodes a time for execution of the light control setting within the lighting control messages, thereby generating one or more time encoded lighting control messages. The network device sends the time encoded lighting control messages to the networked light fixture for execution of the light control settings at the time of execution specified in the time encoded lighting control message.

20 Claims, 5 Drawing Sheets

(56) References Cited

U.S. PATENT DOCUMENTS

2016/0165679 A1* 6/2016 Laherty ............... H05B 33/086
315/294

OTHER PUBLICATIONS

Elation Professional, "DMX 101: A DMX 512 Handbook", May 2008, 24 pages.
Wikipedia, "Network Time Protocol", http://en.wikipedia.org/wiki/Network_Time_Protocol, Retrieved Dec. 8, 2014, 5 pages.
Sound on Sound, "SMPTE & MTC (MIDI Time Code)", Published in SOS Jun. 1996, 2 pages.
International Telecommunication Union, "Timing characteristics of a synchronous Ethernet equipment slave clock", ITU-T G.8262/Y.1362 Jul. 2010, 34 pages.

* cited by examiner

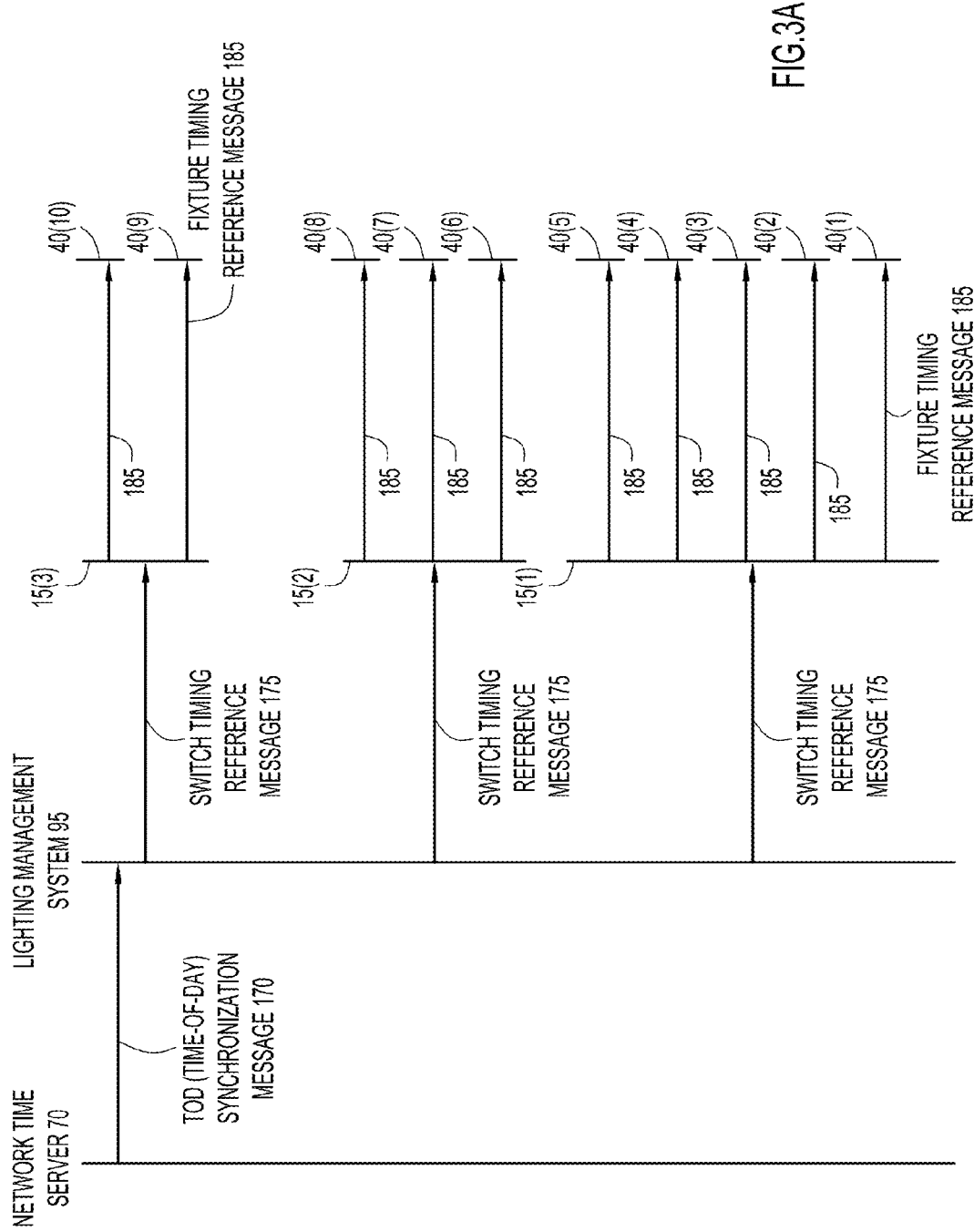

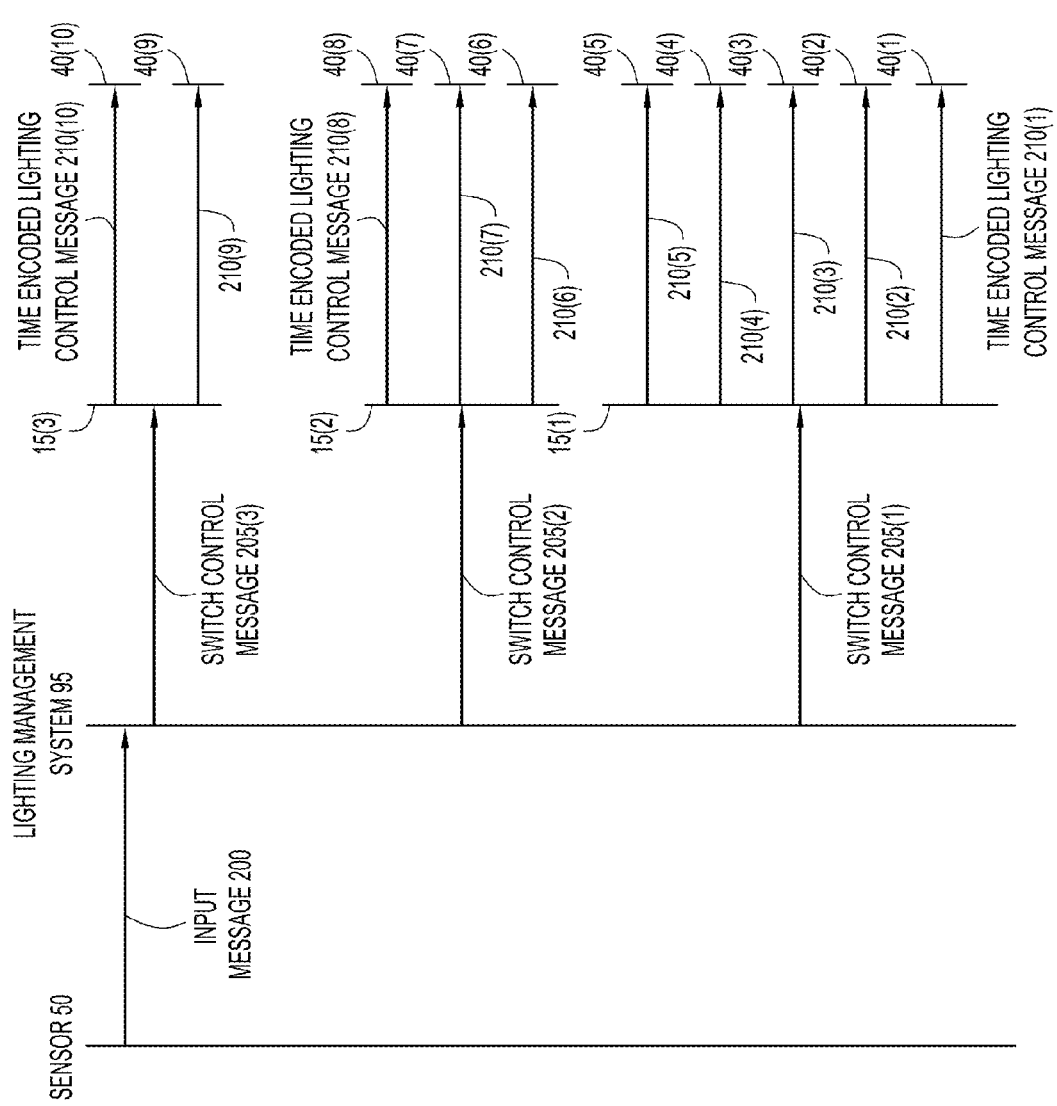

TIME SYNCHRONIZATION OF LIGHTING SERVICES

TECHNICAL FIELD

The present disclosure relates to the control of networked light fixtures.

BACKGROUND

Commercial buildings, highways, parks, and other spaces are increasingly being fit with energy efficient light fixtures (e.g., light emitting diode (LED)-based light fixtures). With light fixtures powered and controlled via a communication network, it is possible to provide building tenants, maintenance workers, and even visitors control over the light emitted in their space. It is often desirable for control operations in networks of these light fixtures to have predictable timing relationships. If standard Internet techniques are used to generate, transport and receive the control messages to all fixtures, the timing may not be predictable, and certain lighting effects may not react in desirable ways.

BRIEF DESCRIPTION OF THE DRAWINGS

FIG. 3A is a diagram illustrating time synchronization messages exchanged in a networked lighting system in accordance with example embodiments presented herein.

FIG. 3B is a diagram illustrating lighting control messages exchanged in a networked lighting system in accordance with example embodiments presented herein.

DESCRIPTION OF EXAMPLE EMBODIMENTS

Overview

Techniques presented herein are directed to synchronizing the execution time of lighting operations within a networked lighting system. In one example, a network device that is connected to at least one networked light fixture accepts one or more timing reference messages representing a network time base. The network device generates one or more lighting control messages that identify at least one light control setting for the networked light fixture connected to the network device. Based on the one or more timing reference messages, the network device encodes a time for execution of the light control setting within the lighting control messages, thereby generating one or more time encoded lighting control messages. The network device sends the time encoded lighting control messages to the networked light fixture for execution of the light control settings at the time of execution specified in the time encoded lighting control message.

Example Embodiments

Figure 1:
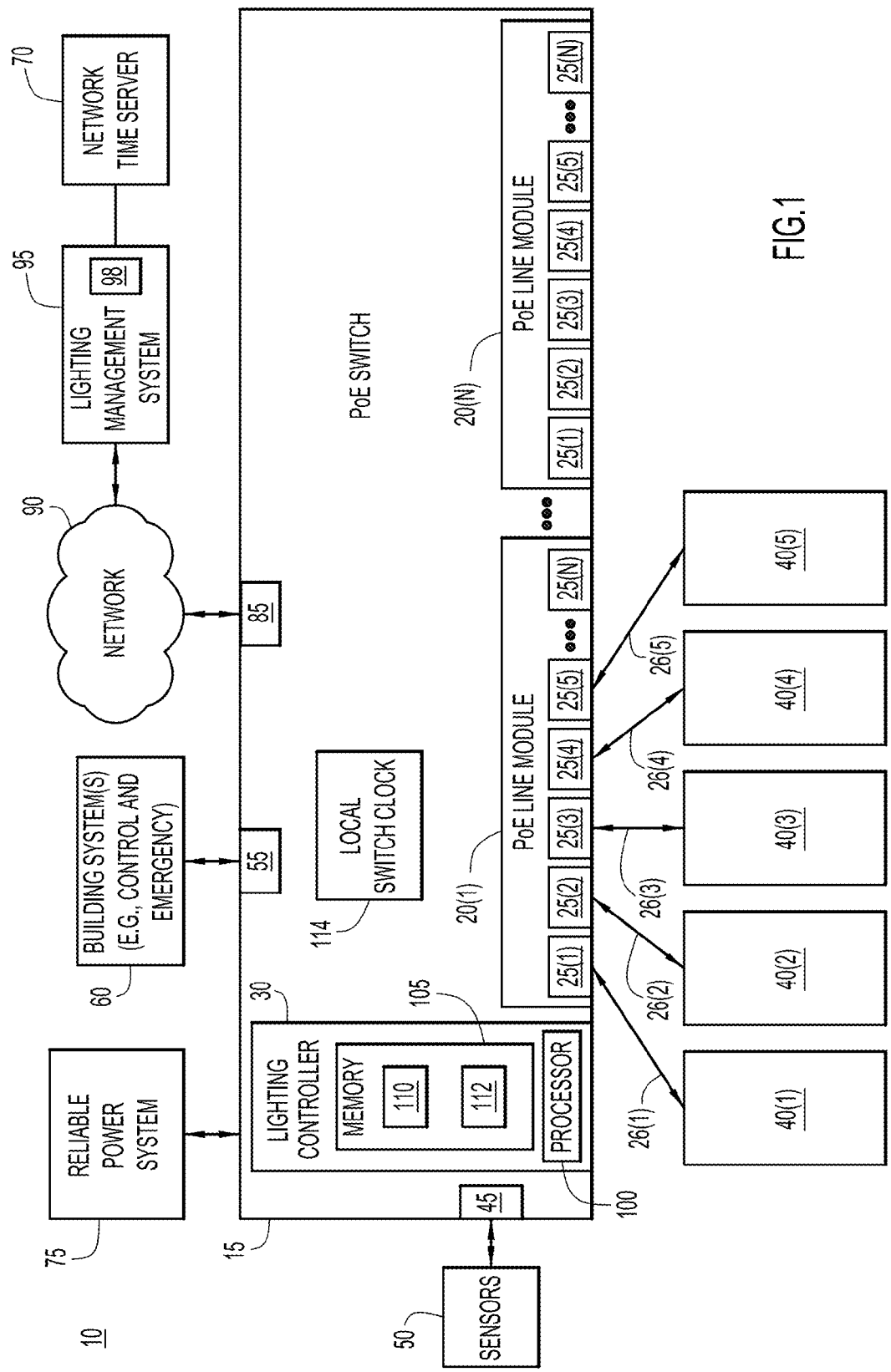
FIG. 1 is a block diagram of a networked lighting system in accordance with example embodiments presented herein.

FIG. 1 is a block diagram of a networked lighting system 10 deployed in a space, such as a commercial building, park, entertainment venue, outdoor architectural lighting region, etc., and configured to implement lighting synchronization techniques presented. Merely for ease of description, the lighting synchronization techniques presented herein are described with reference to networked lighting system 10 deployed in a commercial building. However, it to be appreciated that the lighting synchronization techniques may be employed in different spaces.

As shown in FIG. 1, networked lighting system 10 comprises a network device 15, such as a switch, that includes a plurality of line modules 20(1)-20(N) and a lighting controller 30. The switch 15 may be a Power-over-Ethernet (PoE) switch that uses PoE to provide both power and data to downstream devices using common star topology Ethernet cabling. As such, the line modules 20(1)-20(N) are sometimes referred to herein as PoE line modules 20(1)-20(N). While a PoE switch 15 is used in this example, the techniques presented herein are not limited to use with PoE. Instead, switch 15 may also use other communication mechanisms, such as other network physical layers that provide both power and data to a downstream device using the same underlying transport (e.g., Ethernet). Other such communication mechanisms include, for example, PoE Plus (PoE+), Universal PoE (UPOE), and/or high power Universal Serial Bus (USB). Additionally, the techniques presented herein are applicable to systems that use traditional power sources to power the light fixtures and network connections (wired or wireless) to control the light fixtures (i.e., may be used with communication mechanisms that do not combine data and power).

The PoE line modules 20(1)-20(N) each include a plurality of ports (i.e., PoE ports) 25(1)-25(N). A subset of the ports 25(1)-25(N) are connected, via respective Ethernet cables 26(1)-26(N), to one or more networked light fixtures (multi-color light fixtures). In the example of FIG. 1, five (5) networked light fixtures 40(1)-40(5) are shown in a 5×1 array. Each of the networked light fixtures 40(1), 40(2), 40(3), 40(4), and 40(5) are connected to a respective one of the ports, namely ports 25(1), 25(2), 25(3), 25(4), and 25(5), respectively, of PoE line module 20(1) using a star or hub-and-spoke topology, where switch 15 is the hub and networked light fixtures 40(1)-40(n) are at the end of the spokes. It is to be appreciated that the specific number and arrangement of networked light fixtures shown in FIG. 1 is merely illustrative, and other topologies or network types could be used.

The switch 15 also comprises one or more interfaces 45 for communication with sensors 50 within the building and one or more interfaces 55 for communication with the building system(s) 60. The building systems 60 may comprise, for example, control systems, energy management systems, security systems, and/or emergency systems.

In the specific example of FIG. 1, the switch 15 receives power from a reliable power system 75. The reliable power system 75 may, for example, primarily receive power from a utility grid and include a back-up power mechanism (e.g., generators). The switch 15 also comprises one or more network interface units 85 that enable communication over one or more networks 90 (e.g., Local Area Networks (LANs), Wide Area Networks (WANs), etc.). A lighting management system 95 communicates with a network time server 70 that may be, for example, a time-of-day (ToD) server. The lighting management system 95 is configured to communicate with the switch 15, as well as other switches (not shown in FIG. 1) using network 90. The lighting management system 95 may be used by an administrator or other user to communicate with the switch 15 and control operations and/or settings thereof. As described further below, the lighting management system 95 also provides time-of-day information to the switch 15 as well as any other connected switches.

The switch 15 includes a local switch clock 114 and a lighting controller 30. The lighting controller 30 comprises a processor 100 and a memory 105. Memory 105 comprises control logic 110 and time encoding logic 112. Memory 105 may comprise read only memory (ROM), random access memory (RAM), magnetic disk storage media devices, optical storage media devices, flash memory devices, electrical, optical, or other physical/tangible memory storage devices. The processor 100 is, for example, a microprocessor or microcontroller that executes instructions for the control logic 110 and the time encoding logic 112. Thus, in general, the memory 105 may comprise one or more tangible (non-transitory) computer readable storage media (e.g., a memory device) encoded with software comprising computer executable instructions and when the software is executed (by the processor 100) it is operable to perform time synchronization techniques presented herein.

More specifically, the processor 100 may execute control logic 110 to accept and process data inputs from one or more data sources (e.g., sensors 50, building systems 60, lighting management system 95, network connected mobile devices, etc.). The processor 100 may execute control logic 110 to process the data inputs to identify light control settings for one or more of the networked light fixtures 40(1)-40(5). The processor 100 may execute control logic 110 to generate one or more lighting control messages identifying the light control setting for the networked light fixtures 40(1)-40(5). As described further blow, the processor 100 may execute time encoding logic 112 to synchronize local switch clock 114 with a network time base and to encode control messages with a time for execution of light control settings.

For ease of illustration, control logic 110 and time encoding logic 112 are shown as separate elements. It is to be appreciated that the control logic 110 and time encoding logic 112 may be a single logical element. It also to be appreciated that the software implementation of control logic 110 and time encoding logic 112 shown in FIG. 1 is merely illustrative. In other arrangements, control logic 110 and time encoding logic 112 may be implemented with digital logic gates in one or more application-specific integrated circuits (ASICs). Local switch clock 114 may also be implemented in software or hardware in with digital logic gates in one or more ASICs.

Figure 2:
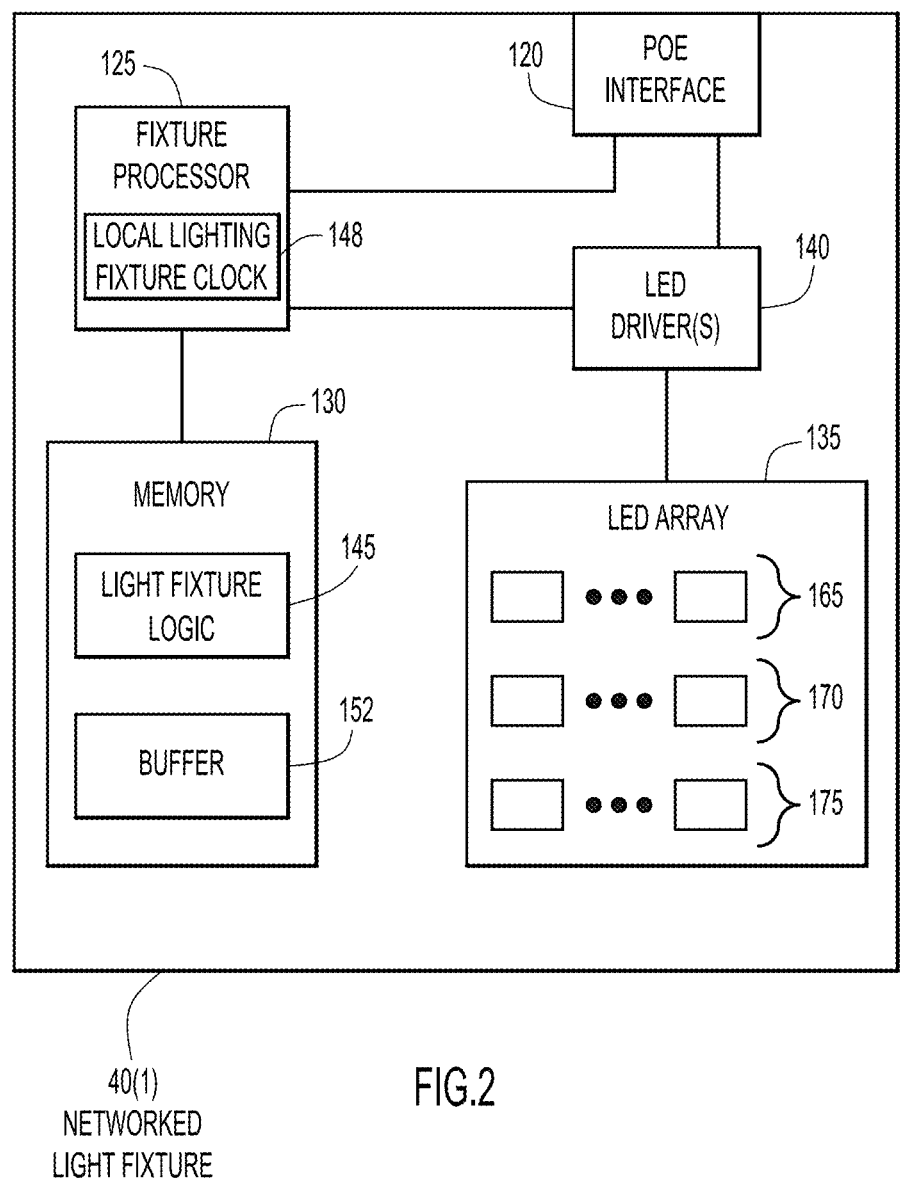
FIG. 2 is a block diagram illustrating the details of a networked light fixture in accordance with example embodiments presented herein.

Also as noted above, the switch 15 is connected to the networked light fixtures 40(1)-40(5) via PoE ports and Ethernet cabling. Each of the networked light fixtures 40(1)-40(5) have a substantially similar configuration in order to, as described further below, provide lighting services to the office building. For ease of illustration, the details of only a single networked light fixture 40(1) are shown in FIG. 2. After explanation of FIG. 2, the description will return to the example of FIG. 1 to describe further details of lighting controller 30 and the lighting synchronization techniques.

As shown in FIG. 2, networked light fixture 40(1) includes a PoE interface 120, a fixture processor 125, an array 135 of light emitting diodes (LEDs), sometimes referred to herein as an "LED array," LED driver(s) 140, a local fixture clock 148, and a memory 130. Memory 130 comprises light fixture logic 145 and a buffer 152. As described further below, the LED array 135 includes a plurality of LED emitters. The memory 130 may comprise ROM, RAM, magnetic disk storage media devices, optical storage media devices, flash memory devices, electrical, optical, or other physical/tangible memory storage devices. The fixture processor 125 is, for example, a microprocessor or microcontroller that executes instructions for the light fixture logic 145. Thus, in general, the memory 130 may include one or more tangible (non-transitory) computer readable storage media (e.g., a memory device) encoded with software comprising computer executable instructions for the light fixture logic 145, and when the software is executed (by the fixture processor 125) it is operable to perform the operations described herein to active the LED array in accordance with messages received from the switch 15 at a correct time. In particular, fixture processor 125 may execute light fixture logic 145 so as to control the output of LED array 135 based on the messages received from switch 15 via the PoE port 25(1) and the associated Ethernet cable 26(1) and do so at a precise time.

The LED array 135 may have a number of different arrangements and include one or more types of emitters. For example, LED array 135 may include multiple sets of emitters arranged to emit individually controlled light in multiple directions or multiple spatial positions. In one specific arrangement, the LED array 135 may include LEDs with warm white light emitters (referred to herein as warm white light LEDs 165), LEDs with cool white light emitters (referred to herein as cool white light LEDs 170), and LEDs with multi-color light emitters (referred to herein as multi-color light LEDs 175). The Kelvin (K) temperature scale is generally used to describe the relative color appearance of white light, where white light appearing more red/orange is referred to as "warm" light while more blue light is referred to as "cool" light. Warm white light is generally in the range of approximately 2,700-3,000 K while cool white light has a color temperature of approximately 4,100K or greater. As such, in one example, the warm white light LEDs 165 are emitters having a color temperature of approximately 3,000 K and the cool white light LEDs 170 are emitters having a color temperature of approximately 5,000K. The fact that people associate warmth with red or orange objects is the reason why the "warm" descriptive name is used to describe the orange/red light, even though it is a cooler (lower) temperature on the Kelvin scale than the "cool" white light. It is to be appreciated that the above color temperatures are merely illustrative and that white light emitters in accordance with examples presented herein may have other color temperatures.

The multi-color light LEDs 175 each have separate red, green, and blue (RGB) emitters incorporated therein. The RGB emitters within a multi-color LED 175 may be activated individually or collectively in a number of manners such that the LED 175 may emit substantially any visible individual color (i.e., a fully controllable color output).

FIG. 2 illustrates a general arrangement for a networked light fixture in accordance with examples presented herein. It is to be appreciated that a networked light fixture may include other components that are not shown in FIG. 2. For example, other networked light fixtures in accordance with examples presented herein may include sensors (e.g., to measure temperature, an actual light level emitted by LED array 135, etc.), power control circuits, an on-board battery, a battery controller/charger, etc. Additionally, the networked light fixtures may have a number of different structural forms such as, for example, ceiling troffers, pendants, valances, track lights, strips, task lights, lighting integrated into furniture or cabinets, desk lamps, floor lamps, streetlights, high-bay lighting, etc. It is also to be appreciated that the networked light fixture 40(1)-40(5) may have other configurations.

Returning to the example of FIG. 1, with traditional lighting systems (e.g., systems that use analog AC powered lights) consumers are used to turning on a light switch and seeing all the lights on the circuit turn on at the same time.

When PoE powered and network controlled light fixtures are placed in a star network topology with multiple switches, lights, etc., the lights turn on when they receive a command. However, Ethernet networks, especially networks that may be overloaded, are generally unpredictable in relation to packet delivery timing/order. This means that light fixtures in current PoE topologies may turn on at different times, especially if the lighting commands come from a cloud-based controller where the lighting commands are susceptible to variable loads and network overload conditions. For example, if a user elects to turn all lights on within a space at the same time (i.e., hits an "all on" switch), in a conventional PoE network the lights may activate (turn on) in a strange pattern that is different from traditional lighting systems, with a time skew duration approaching one second. As such, presented herein are techniques that provide a synchronization infrastructure for PoE lighting systems. In general, the lighting synchronization techniques presented herein provide a mechanism to precisely synchronize (e.g., sub-millisecond timing resolution) the time that a command will be executed on an individual light fixture, thereby ensuring that all lighting fixtures in an installation/space operate according to the same time reference, while preserving the significant advantages of a large-scale all-IP network. The synchronization of lighting control settings, such as brightness changes, in a large network of light fixtures, eliminates the impact of control network packet delay and jitter. This can permit a large network of lights in a space to, for example, turn on exactly simultaneously, thereby enabling special effects like strobes, chases, flashes, and synchronization to music.

In operation, lighting management system 95 receives time-of-day (ToD) information from network time server 70. This ToD information represents a network time base that may be used by the networked lighting system 10. As such, lighting management system 95 maintains a lighting system clock 98 and provides timing reference messages to switch 15 and any other switches connected to the lighting management system 95. The timing reference messages sent to the switches, which are sometimes referred to herein as switch timing reference messages, represent the current time of the lighting system clock 98 and thus the network time base. The switch timing reference messages may be provided to the switch 15 periodically, on demand, etc.

The lighting controller 30 uses the switch timing reference messages to update local switch clock 114 (i.e., synchronize the switch clock to the network time base). The lighting controller 30 then distributes timing reference messages to all the lighting fixtures 40(1)-40(5) using the PoE links (i.e., PoE ports 25(1)-25(5) and corresponding Ethernet cables 26(1)-26(5)). The timing reference messages sent to the networked light fixtures 40(1)-40(5), which are sometimes referred to herein as fixture timing reference messages, represent the current time of the local switch clock 114 transferred to fixture clocks (148 in FIG. 2) and thus the distributed network time base. The fixture timing reference messages may be provided to the switch 15 periodically, on demand, etc.

Each light fixture 40(1)-40(5) maintains a local time of day (ToD) clock 148 that is sometimes referred to as a local lighting fixture clock. The local lighting fixture clock 148 is synchronized to the network time base via the received fixture timing reference messages. Using this mechanism, each lighting fixture 40(1)-40(5) maintains the exact time of day, with a precision of approximately one (1) millisecond, as set forth by the network time base.

In certain examples, the lighting controller 30 serves as a policy engine that coordinates and controls the attributes of the emitters within the LED arrays of light fixture 40(1)-40(5). As such, the lighting controller 30 sends lighting control messages/commands over PoE (i.e., via PoE ports and corresponding Ethernet cables) to the lighting fixtures 40(1)-40(5). The messages received from lighting controller 30 identify/define one or more operations or outputs, referred to herein as light control settings, for the LED arrays, such as LED array 135 of lighting fixture 40(1). In other words, the messages received from lighting controller 30 define selected operational outputs for the LED array 135.

When lighting control messages are sent to the light fixtures (originating either at the lighting controller 30 or the lighting management system 95), they are encoded with a time of execution for the light control settings. That is, the lighting controller 30 embeds information in the lighting control messages indicating the time at which the receiving light fixture should execute the light control settings. Lighting control messages that are encoded to include the time of execution of the light control settings are referred to herein as time encoded lighting control messages.

In some cases, the time of execution encoded within a time encoded lighting control message is zero (0) or a time in the past. A past or zero time causes the lighting fixture (e.g., fixture processor 125) to substantially immediately execute the light control settings identified within the time encoded lighting control message. However, in other cases, the time of execution is set to a future time (e.g., set to a fraction of a second in the future). The future time may be a sufficient length of time to account for network latency variability, and insure that all messages have been received and buffered by networked light fixtures 40(1)-40(5).

The lighting fixtures buffer the time encoded lighting control messages (e.g., in buffer 152) until the time of the local lighting fixture clock matches the commanded time of execution. The light control settings identified in the lighting control messages are then executed when the time of the local lighting fixture clock matches the commanded time of execution.

The lighting synchronization techniques presented herein allow for very precise control over the behavior of a networked lighting system, even if there are significant (e.g., tens or hundreds of ms) packet delays or jitter occasionally experienced as the time encoded lighting control messages traverse the network hierarchy. In this way, if a light control in a room is turned on, and this control is programmed to influence a hundred discrete light fixtures, all of the lighting fixtures may come on at exactly the same millisecond. In contrast, in conventional arrangements (i.e., without use of the lighting synchronization techniques), the "on" times may be staggered across a few hundred milliseconds (in high jitter networks), which would be noticeable to a user. Although there is an artificially induced delay, this delay is imperceptible to a user and, instead, the user perceives that all lights come on at exactly the same time. This is more aesthetically pleasing than if the fixtures came on with tens of milliseconds of control jitter. The precise synchronization of events is also valuable to insure an entire array of fixtures is acting in exact concert to, for example, produce a strobe effect for a fire alarm, building evacuation, etc.

Certain types of light fixtures produce high inrush currents upon startup. If hundreds of these fixtures are switched on exactly simultaneously, the coincidence of high inrush currents from them all could overload the circuits that are supplying them (especially critical if PoE energy distribution is used, where the instantaneous power available on a single circuit, linecard, or chassis is subject to rigid limits). As such, it may be beneficial to stagger the start-up time of light fixtures in a space to prevent system failure from a large simultaneous inrush of currents to light fixtures. In accordance with the lighting synchronization techniques presented herein, lighting control messages may be delivered to light fixtures with slightly staggered times of execution such that the total inrush current stays below an overload limit for the system.

The lighting synchronization techniques presented herein also enable a number of different special effects that are not possible with traditional lighting systems or conventional networked lighting systems. For example, in a theater, the house lights could be dimmed in a "wave" from the lobby to the stage that lasts a few seconds. Each row of light fixtures in a large venue may be staggered to dim (or conversely turn on) by a few tens of milliseconds from the adjacent row. However, these effects could be destroyed in conventional networked lighting systems if network jitter causes a delay in the delivery of commands to any of the light fixtures. Using the lighting synchronization techniques presented herein, time encoded lighting control messages may be delivered to the various rows with slightly staggered times of execution. The time encoded lighting control messages may also be delivered to the various rows sufficiently ahead of time (e.g., several seconds) to ensure that all rows can execute the light control settings at the precise time. It is to be appreciated that various animated displays, chases, path guidance features and attention grabbing lighting plans which require the precise control of the exact command execution time can also be advantageously enabled through the use of the lighting synchronization techniques presented herein.

In another example, a still photographer taking pictures in a space equipped with the networked light fixtures 40(1)-40(5) may make use of the lighting synchronization techniques to emulate a professional studio's photographic flash units. When the photographer clicks the shutter of a camera (e.g., professional camera, smart phone camera, tablet computer camera, etc.), a wireless message is sent to the lighting controller 30 via sensors 50, which include a wireless receiver. The wireless message indicates the camera shutter will open at a time in the near future (e.g., 20 ms in the future, referenced to the camera's local clock, which has been previously synchronized to the lighting system clock 98). The wireless "about to shoot" message is processed by the lighting controller 30, creating two time encoded lighting control messages for each (or a subset of) the light fixtures 40(1)-40(5). The first message instructs the fixtures to go to full (or commanded) brightness at the specified shutter open time. The second message may be timed between 1 and 20 milliseconds (depending upon desired flash duration, between 1/1000 and 1/50 of a second) later than the first message, and instructs the fixtures to return to their previous brightness levels. When the commanded time arrives, the shutter opens, the emitters in the light fixtures go from default output to a higher programmed flux, wait for the programmed flash duration, and return to default light levels. Without this synchronization infrastructure, network delays and jitter would prevent the synchronization of the flash on and off times across all fixtures, and with the camera's shutter.

FIG. 3A is a diagram illustrating messages exchanged in networked lighting system 10 of FIG. 1 during a time synchronization phase in accordance with examples presented herein. FIG. 3A illustrates a specific arrangement of the networked lighting system 10 that includes three (3) switches 15(1)-15(3), and ten (10) light fixtures 40(1)-40(10). Switch 15(1) corresponds to switch 15 of FIG. 1 and, as such, is connected to light fixtures 40(1)-40(5) via corresponding PoE links. Switch 15(2) is connected to light fixtures 40(6)-40(8) via corresponding PoE links while switch 15(3) is connected to light fixtures 40(9) and 40(10) via corresponding PoE links.

As shown in FIG. 3A, network time server 70 sends a ToD synchronization message 170 to the lighting management system 95. The lighting management system 95 uses the ToD synchronization message 170 to synchronize the lighting system clock 98 with the time of the network time server 70. The lighting management system 95 utilizes the lighting system clock 98 to generate switch timing reference messages 175 that are provided to each of the switches 15(1)-15(3). The switches 15(1)-15(3) utilize the timing reference messages 175 to update local switch clocks and to generate and send fixture timing reference messages 185 to the respective light fixtures connected thereto. The light fixtures 40(1)-40(10) use the switch timing reference messages 185 to synchronize their respective local lighting fixture clock to the lighting system clock 98 and, as such, to the network time base (i.e., the time of the network time server 70).

It is to be appreciated that the illustration of FIG. 3A is simplified for ease of description. More specifically, in the illustration of FIG. 3A, any jitter in the unidirectional delivery of messages 170, 175, 185 could cause local fixture time bases 148 to be set to different times. In practice, these messages should use a bidirectional protocol, where a set message is sent, the time is read back to the setting node, and adjustments are sent to the far node to compensate for delay and jitter.

FIG. 3B is a diagram illustrating control/command messages exchanged in networked lighting system 10 of FIG. 1 during a lighting control phase in accordance with examples presented herein. Similar to FIG. 3A, FIG. 3B illustrates a specific arrangement of the networked lighting system 10 that includes three (3) switches 15(1)-15(3), and ten (10) light fixtures 40(1)-40(10). Switch 15(1) corresponds to switch 15 of FIG. 1 and, as such, is connected to light fixtures 40(1)-40(5) via corresponding PoE links. Switch 15(2) is connected to light fixtures 40(6)-40(8) via corresponding PoE links while switch 15(3) is connected to light fixtures 40(9) and 40(10) via corresponding PoE links. The control phase shown in FIG. 3B may take place subsequent to the time synchronization phase shown in FIG. 3A (i.e., after the light fixtures are synchronized to the network time base).

As shown in FIG. 3B, lighting management system 95 receives an input message 200 from, for example, a sensor 50 (e.g., directly, via switch 15(1), etc.). In this example, the lighting management system 95 uses information in the input message 200 to generate switch control messages 205(1), 205(2), and 205(3) sent to the switches 15(1), 15(2), and 15(3), respectively. Using the respective switch control messages 205(1), 205(2), and 205(3), the switches 15(1), 15(2), and 15(3), generate and send time encoded lighting control messages 210(1)-210(10) to the respective light fixtures 40(1)-40(10) that cause the light fixtures to perform one or more operations. As describe above, time encoded lighting control messages identify light control settings (i.e., operation(s) to be performed by a light fixture) and specify a time of execution for the light control settings. The time encoded lighting control messages 210(1)-210(10) are sent to the respective light fixtures 40(1)-40(10) using PoE links. As described above, the lighting control messages 210(1)-

210(10) may be buffered (e.g., in buffers 152 shown in FIG. 2) until the associated time of execution is reached.

Figure 4:
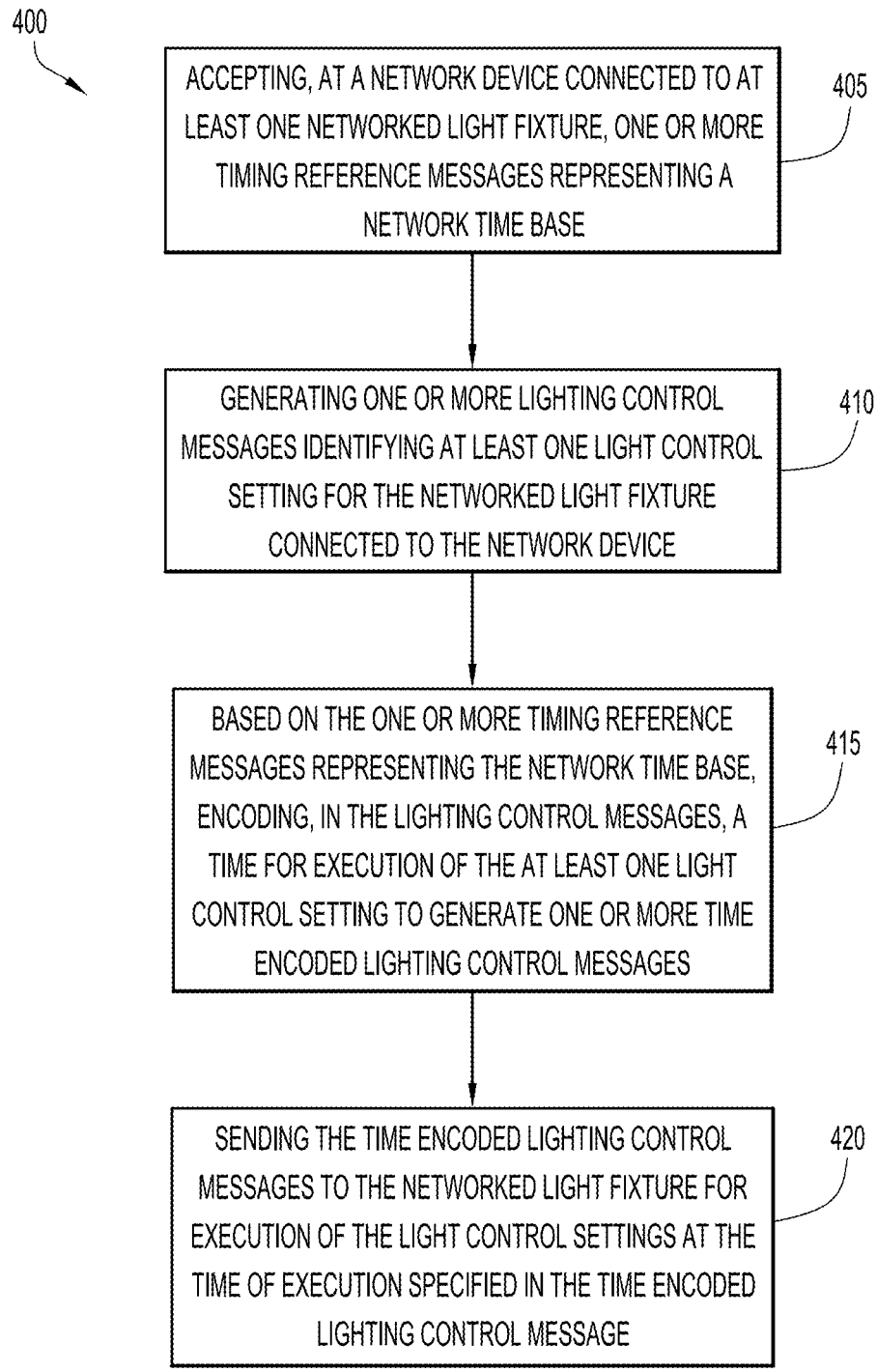
FIG. 4 is a flowchart of a method in accordance with example embodiments presented herein.

FIG. 4 is a flowchart of a method 400 in accordance with examples presented herein. Method 400 begins at 405 wherein a network device accepts one or more timing reference messages representing a network time base. The network device is connected to at least one networked light fixture that comprises a local processor and a plurality of light emitters. At 410, the network device generates one or more lighting control messages identifying at least one light control setting for the networked light fixture connected to the network device. At 415, based on the one or more timing reference messages representing the network time base, the network device encodes a time for execution of the at least one light control setting in the lighting control messages, thereby generating one or more time encoded lighting control messages. At 420, the network device sends the time encoded lighting control messages to the networked light fixture for execution of the light control settings by the local processor at the time of execution specified in the time encoded lighting control message.

Presented herein are time synchronization techniques for use in networked lighting systems. The time synchronization techniques can precisely synchronize brightness changes on a large network of light fixtures, eliminating the impact of control network packet delay and jitter. In general, the time synchronization techniques enable all light events to have the same time reference, within less than a millisecond difference, so that all lights in a room respond to on/off commands at exactly the same time or effects like alarm strobes, chases, and animated displays react correctly, even in the presence of moderate network jitter.

Thus, in one form, a method is provided comprising: accepting, at a network device connected to at least one networked light fixture, one or more timing reference messages representing a network time base; generating one or more lighting control messages identifying at least one light control setting for the networked light fixture connected to the network device; based on the one or more timing reference messages representing the network time base, encoding, in the lighting control messages, a time for execution of the at least one light control setting to generate one or more time encoded lighting control messages; and sending the time encoded lighting control messages to the networked light fixture for execution of the at least one light control setting at the time of execution specified in the time encoded lighting control message.

In another form, an apparatus is provided comprising: one or more network interface devices connected to at least one networked light fixture; a memory; and a processor that: accepts one or more timing reference messages representing a network time base, generates one or more lighting control messages identifying at least one light control setting for the networked light fixture, based on the one or more timing reference messages representing the network time base, encodes, in the lighting control messages, a time for execution of the at least one light control setting to generate one or more time encoded lighting control messages, and sends the time encoded lighting control messages to the networked light fixture for execution of the at least one light control setting at the time of execution specified in the time encoded lighting control message.

In still another form, one or more computer readable storage media encoded with software comprising computer executable instructions and when the software is executed operable to: accept, at a network device connected to at least one networked light fixture, one or more timing reference messages representing a network time base; generate one or more lighting control messages identifying at least one light control setting for the networked light fixture connected to the network device; based on the one or more timing reference messages representing the network time base, encode, in the lighting control messages, a time for execution of the at least one light control setting to generate one or more time encoded lighting control messages; and send the time encoded lighting control messages to the networked light fixture for execution of the at least one light control setting at the time of execution specified in the time encoded lighting control message.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   accepting, at a network device connected to at least one networked light fixture, one or more timing reference messages representing a network time base;
   generating one or more lighting control messages identifying at least one light control setting for the networked light fixture connected to the network device;
   based on the one or more timing reference messages representing the network time base, encoding, in the lighting control messages, a time for execution of the at least one light control setting to generate one or more time encoded lighting control messages; and
   sending the time encoded lighting control messages to the networked light fixture for execution of the at least one light control setting at the time of execution specified in the time encoded lighting control message.

2. The method of claim 1, further comprising:
   buffering the time encoded lighting control messages at the networked light fixture until the time of execution specified in the time encoded lighting control message.

3. The method of claim 1, wherein the network time base is a time-of-day server connected to a lighting management system in communication with the network device, and wherein accepting the one or more timing reference messages comprises:
   receiving timing reference messages from the lighting management system.

4. The method of claim 1, wherein sending the time encoded lighting control messages to the networked light fixture comprises:
   sending the time encoded lighting control messages via Power over Ethernet (PoE).

5. The method of claim 1, wherein the time for execution of the at least one light control setting is a future time.

6. The method of claim 1, wherein the time for execution of the at least one light control setting is set to zero or a past time such that the networked light fixture executes the at least one light control setting immediately.

7. The method of claim 1, wherein sending the time encoded lighting control messages to the networked light fixture comprises:
   sending the time encoded lighting control messages via at least one of PoE Plus, Universal PoE, or high power Universal Serial Bus.

8. An apparatus, comprising:
   one or more network interface devices connected to at least one networked light fixture;
   a memory; and a processor configured to:
   accept one or more timing reference messages representing a network time base,
   generate one or more lighting control messages identifying at least one light control setting for the networked light fixture,
   based on the one or more timing reference messages representing the network time base, encode, in the lighting control messages, a time for execution of the at least one light control setting to generate one or more time encoded lighting control messages, and
   send the time encoded lighting control messages to the networked light fixture for execution of the at least one light control setting at the time of execution specified in the time encoded lighting control message.

9. The apparatus of claim 8, wherein the networked light fixture buffers the time encoded lighting control messages until the time of execution specified in the time encoded lighting control message.

10. The apparatus of claim 8, wherein the network time base is a time-of-day server connected to a lighting management system, and wherein to accept the one or more timing reference messages, the processor is configured to:
   receive timing reference messages from the lighting management system.

11. The apparatus of claim 8, wherein to send the time encoded lighting control messages to the networked light fixture, the processor is configured to:
   send the time encoded lighting control messages via Power over Ethernet (PoE).

12. The apparatus of claim 8, wherein the time for execution of the at least one light control setting is a future time.

13. The apparatus of claim 8, wherein the time for execution of the at least one light control setting is set to zero or a past time such that the networked light fixture executes the at least one light control setting immediately.

14. The apparatus of claim 8, wherein to send the time encoded lighting control messages to the networked light fixture, the processor is configured to:
   send the time encoded lighting control messages via at least one of PoE Plus, Universal PoE, or high power Universal Serial Bus.

15. One or more computer readable storage media encoded with software comprising computer executable instructions and when the software is executed operable to:
   accept, at a network device connected to at least one networked light fixture, one or more timing reference messages representing a network time base;
   generate one or more lighting control messages identifying at least one light control setting for the networked light fixture connected to the network device;
   based on the one or more timing reference messages representing the network time base, encode, in the lighting control messages, a time for execution of the at least one light control setting to generate one or more time encoded lighting control messages; and
   send the time encoded lighting control messages to the networked light fixture for execution of the at least one light control setting at the time of execution specified in the time encoded lighting control message.

16. The computer readable storage media of claim 15, further comprising instructions operable to:
   buffer the time encoded lighting control messages at the networked light fixture until the time of execution specified in the time encoded lighting control message.

17. The computer readable storage media of claim 15, wherein the network time base is a time-of-day server connected to a lighting management system in communication with the network device, and wherein the instructions operable to accept the one or more timing reference messages comprise instructions operable to:
   receive timing reference messages from the lighting management system.

18. The computer readable storage media of claim 15, wherein the instructions operable to send the time encoded lighting control messages to the networked light fixture comprise instructions operable to:
   send the time encoded lighting control messages via Power over Ethernet (PoE).

19. The computer readable storage media of claim 15, wherein the time for execution of the at least one light control setting is a future time.

20. The computer readable storage media of claim 15, wherein the time for execution of the at least one light control setting is set to zero or a past time such that the networked light fixture executes the at least one light control setting immediately.

\* \* \* \* \*